US007256640B2

United States Patent
Ucciardello et al.

(10) Patent No.: US 7,256,640 B2
(45) Date of Patent: Aug. 14, 2007

(54) MULTI-STAGE CHARGE PUMP VOLTAGE GENERATOR WITH PROTECTION OF THE DEVICES OF THE CHARGE PUMP

(75) Inventors: Carmelo Ucciardello, Catania (IT); Rosa Di Mauro, Catania (IT); Domenico Pappalardo, Gravina di Catania (IT); Francesco Sorrentino, Cantania (IT); Giuseppe Maganuco, Acate (IT); Gaetano Palumbo, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 49 days.

(21) Appl. No.: 11/028,392

(22) Filed: Jan. 3, 2005

(65) Prior Publication Data
US 2006/0145747 A1 Jul. 6, 2006

(51) Int. Cl.
G05F 1/10 (2006.01)
(52) U.S. Cl. ...................................... 327/536; 327/537
(58) Field of Classification Search ................ 327/536, 327/537
See application file for complete search history.

(56) References Cited

U.S. PATENT DOCUMENTS

| 4,839,787 | A | * | 6/1989 | Kojima et al. ................. 363/60 |
| 5,898,335 | A | * | 4/1999 | Miyamoto et al. .......... 327/535 |
| 6,278,315 | B1 | * | 8/2001 | Kim ............................. 327/536 |
| 6,476,666 | B1 | * | 11/2002 | Palusa et al. ................ 327/536 |
| 2003/0214346 | A1 | * | 11/2003 | Pelliconi ....................... 327/536 |
| 2005/0093614 | A1 | * | 5/2005 | Lee .............................. 327/536 |

* cited by examiner

*Primary Examiner*—Kenneth B. Wells
*Assistant Examiner*—An T. Luu
(74) *Attorney, Agent, or Firm*—Lisa K. Jorgenson; Allen, Dyer, Doppelt, Milbrath & Gilchrist, P.A.

(57) ABSTRACT

Protecting the devices of a charge pump includes the connection of a high-voltage transistor between the output node of the charge pump and the load being supplied, and in controlling this transistor with a fraction of the output voltage of the charge pump. This control is accomplished by connecting the control node of the high-voltage transistor to a node of connection between two stages of the multi-stage charge pump onto which a fraction of the controlled output voltage of the multi-stage charge pump is produced. The high-voltage output transistor protects the low voltage devices of the multi-stage charge pump, by preventing the controlled output voltage from undergoing excessively abrupt variations, that could damage the transistors of the last stage of the charge pump.

14 Claims, 10 Drawing Sheets

MULTI-STAGE CHARGE PUMP VOLTAGE GENERATOR WITH PROTECTION OF THE DEVICES OF THE CHARGE PUMP

FIELD OF THE INVENTION

The present invention relates to boosted voltage generators and more particularly to a multi-stage charge pump having a protection circuit for protecting the devices of the last stage of the multi-stage charge pump.

BACKGROUND OF THE INVENTION

Charge pump voltage generators are widely used for powering certain electronic circuits at a specified boosted voltage $V_{Out}$ (higher than the supply voltage) that must remain substantially constant notwithstanding variations of the current absorbed by the load currently connected to the output of the boosted voltage generator. Keeping the output boosted voltage $V_{Out}$ of a charge pump substantially constant for ensuring the correct operation of the powered electronic circuits may be difficult in certain situations.

As depicted in FIG. 1A, in a nonvolatile memory device, the output node of the boosted voltage generator may be connected through an array of switches $S_i$ (i=1 . . . N) HV MANAGEMENT to respective loads $L_i$, and switching from a load to another may cause an abrupt variation of the current drawn from the charge pump. To better understand how this may happen reference is made to FIG. 1b that shows a charge pump powering a load. The load is illustrated as a current generator drawing a current $I_L$ from the charge pump, in parallel with a capacitor $C_L$ representing the capacitance of the load. If at the instant of connecting the load to the output of the charge pump, the capacitance $C_L$ of the load is already charged at the nominal output voltage generated by the charge pump, only the current $I_L$ will be absorbed by the load. By contrast, if at the instant of connecting the load to the output of the charge pump the capacitance $C_L$ is practically discharged, a current sensibly greater than $I_L$ will charge the load capacitance.

Especially in memory devices, charge-pump generators must power loads of relatively large capacitance. If for example the load capacitance is practically discharged when a certain load is switched to the output node of the powering boosted voltage generator, the charge pump circuit may be momentarily unable to provide the specified voltage, and the output voltage $V_{Out}$ may even drop to zero.

Problems may arise when a load is disconnected from the output node Out of the charge pump and a different load is connected thereto, as shown in FIG. 2. At the instant the new connection is made, the voltage $V_{Out}$ may undergo a sensible variation, either increase or decrease, before reaching the correct value (for example $V_{x2}$) specified for the new load (for example $L_2$) to be powered. These abrupt variations of the voltage $V_{Out}$ do not cause problems to the integrity of the transistors of the charge pump if they are designed to withstand a comfortably higher voltage than the largest voltage that may be foreseen, in other words so-called "high-voltage" transistors, because their relatively thicker gate oxides may withstand relatively high voltage differences $V_{OX}$, between gate and source, between gate and drain and between gate and body. At the same time, the channel length of these "high-voltage" transistors are such that even by applying relatively high voltage differences $V_{DS}$ between their drain and source, the underlying depletion regions do not merge, and therefore punch-through of the channel, which could cause extraordinarily large drain-source current likely to damage the transistor, is prevented.

However, there is a penalty in using high-voltage transistors for the charge pump circuit because of the increased silicon area required. For this reason, very often the transistors of the charge pump are "normal" low-voltage transistors, as shown in the latch charge pump circuit of FIG. 3. In this situation, the transistors of the last stage of the multistage charge pump are likely to be damaged through the breaking of their gate oxide if the applied voltage $V_{OX}$ becomes larger than the design supply voltage $V_{dd}$. Moreover, because the channels of normal low-voltage transistors are relatively shorter than those of high-voltage transistors, if the drain-source voltage $V_{DS}$ exceeds the supply voltage $V_{dd}$, the channels are likely to be punched-through and the transistors damaged.

To prevent these risks that may be determined by a large and abrupt variation of the voltage $V_{Out}$, it is known to interpose two protection circuits between the output node of the charge pump and the array of switches HV MANAGEMENT, as depicted in FIG. 4. A first protection circuit, UP PROTECTION, protects the devices of the charge pump when the output voltage $V_{Out}$ increases while the other, DOWN PROTECTION, protects the devices of the charge pump when the voltage $V_{Out}$ decreases. Indeed, these dedicated protection circuits may be used to protect any charge pump. For simplicity, only the circuit DOWN PROTECTION will be analyzed in detail.

As shown in FIG. 5, the circuit DOWN PROTECTION protect the transistors of the charge pump by preventing the voltage $V_{Out}$ from following the voltage $V_{OutExt}$ when it decreases abruptly. This circuit must be effective even in the worst case, that is when the voltage $V_{OutExt}$ undergoes the largest possible variation. As depicted in FIG. 6, this situation takes place when a load $L_1$ charged at the maximum boosted voltage $V_{XMax}$ is disconnected and a load $L_2$ is completely connected to the output of the charge pump.

A circuit for protecting the charge pump devices acts substantially as a voltage limiter, by preventing the voltage $V_{OutInt}$ to decrease below a minimum value $V_{Outmin}$. A voltage limiter may be realized by inserting a high-voltage PMOS between the output node of the charge pump and the switches HV MANAGEMENT, as shown in FIG. 7. The gate of the high voltage PMOS transistor is set to a reference voltage $V_{Ref}$ such to prevent the output voltage of the charge pump $V_{OutInt}$ from falling below a value $V_{Outmin}$ $$V_{Outmin} = V_{Ref} + V_{Th} \quad (1)$$

$V_{Th}$ being the threshold voltage of the PMOS transistor.

Preferably, the voltage $V_{Outmin}$ is close to the maximum admissible boosted voltage $V_{XMax}$ on a load, for limiting as much as possible the range of the output voltage $V_{OutExt}$ within which it may vary without turning off the PMOS. A limit condition is:

$$V_{Outmin} = V_{XMax} \quad (2)$$

In so doing the voltage $V_{OutInt}$ remains constant $$V_{OutInt} = V_{Outmin} = V_{XMax} \quad (3)$$

and the charge pump is protected.

Unfortunately, a constant voltage $V_{OutInt}$ implies that the current $I_{Out}$ delivered by the charge pump be constant and this is a drawback both in transient as well as in steady state conditions. To better understand why this is a drawback, consider first the case of steady state functioning and model the loads $L_i$ to be powered by the charge pump with current generators $I_{Li}$. For dimensioning the charge pump it is necessary to determine its total capacitance $C_{Tot}$, given by the following equation:

$$C_{Tot} = \frac{N^2}{(N+1)V_{dd} - V_{OutInt}} \cdot \frac{I_{Out}}{f} \quad (4)$$

wherein f is the frequency of the clock signal used by the charged pump. To evaluate the maximum total capacitance, in the above equation (4), the current $I_{Out}$ is substituted with the maximum current $I_{XMax}$ that the loads $L_i$ may absorb, while the voltage $V_{OutInt}$ is the maximum possible voltage $V_{XMax}$. The maximum capacitance $C_{TotLim}$ is $$C_{TotLim} = \frac{N^2}{(N+1)V_{dd} - V_{XMax}} \cdot \frac{I_{XMax}}{f} \quad (5)$$

The voltage on the load is always smaller than or equal to the voltage $V_{XMax}$.

If the voltage on the load is $V_{XMax}$, then the voltage limiter does not introduce any loss of efficiency, while if it is smaller than $V_{XMax}$, the voltage limiter causes inefficiency by not allowing the voltage $V_{OutInt}$ to become smaller than the voltage $V_{XMax}$. By contrast, without the limiter, the voltage $V_{OutInt}$ would decrease to a desired voltage $V_{XDes}$ and this would allow the charge pump to deliver to the load a current $I_{XDes}$ larger than the maximum current that it may deliver in presence of the voltage limiter. This situation is illustrated by the diagram of FIG. 8.

Alternatively, a charge pump without voltage limiter for delivering a certain maximum current $I_{XMax}$, at a certain voltage $V_{XDes} < V_{XMax}$, could be designed with a smaller capacitance than that $C_{TotLim}$ required when the voltage limiter is present. Therefore, the presence of the voltage limiter in steady state conditions implies increasing the design capacitance $C_{Tot}$ of the charge pump and thus the silicon area requisite.

The graph of FIG. 9 is a sample voltage-capacitance characteristic of a charge pump for a certain current $I_{Out}$. The operation is analyzed in transient conditions by supposing that the charge pump must initially charge a completely discharged capacitance $C_i$. In a charge pump with voltage limiter, the voltage $V_{OutInt}$ equals $V_{XMax}$, thus the delivered current and the raising slope of the voltage $V_{OutExt}$ are kept constant for the whole charge time, as shown by the straight line in FIG. 10. Without voltage limiter, the output voltage of the charge pump in transient conditions rise quickly from 0 to $V_{XMax}$ and the charge pump is able to provide a larger current than with the voltage limiter, thus achieving a charge time $t_{rNoLim}$ smaller than $t_{rLim}$ or, for the same charge time $t_{rLim}$, it requires a reduced silicon area.

By summarizing, the drawback of using the voltage limiter is that of fixing the voltage $V_{Outmim}$. If $V_{Outmin}$ is smaller than $V_{XMax}$ the charge pump may be damaged. If $V_{Outmin}$ equals $V_{XMax}$ the charge pump is protected but the silicon area occupied by the charge pump is increased.

To avoid the drawbacks determined by the presence of a voltage limiter, it is necessary to use a circuit capable of varying the voltage $V_{OutInt}$, in particular a circuit capable of reducing it from its maximum value (for instance $V_{XMax}$) to zero, for adapting it as necessary. This circuit should also let the voltage $V_{OutInt}$ decrease slowly in respect to a clock period for permitting the internal nodes Int of the charge pump to fall in line with the gradual voltage reduction.

Referring to FIG. 11, a charge pump is shown with its parasitic output node capacitance $C_{OutInt}$ powering a generic load $L_i$ initially at null voltage. The voltage $V_{OutInt}$ may undergo a large and abrupt reduction that could damage the transistors of the charge pump. This voltage drop is due to the large absorbed current $I_C$ and to the consequent discharge of the capacitance $C_{OutInt}$. To prevent any abrupt reduction of the voltage $V_{OutInt}$, a current limiter is commonly used, as shown in FIG. 12. To let the voltage $V_{OutInt}$ decrease toward zero with a controlled slope such to prevent the risk of damaging the charge pump, the maximum current $I_{Lim}$ allowed by the voltage limiter is properly chosen. In steady state conditions, the capacitance $C_{OutInt}$ does not absorb any current, thus $$I_{Lim} = I_{Out} \quad (6)$$

The possibility of $V_{OutInt}$ dropping to zero must be contemplated, therefore the current $I_{Lim}$ must be larger than or equal to the current $I_{Out}$ that would be obtained with a null voltage $V_{OutInt}$, that is:

$$I_{Lim} \geq I_{Out}|_{VOutInt=0} \quad (7)$$

This is inconvenient. In fact the current $I_{Out}$ when $V_{OutInt}$ is null is two or three times larger than the current $I_{Out}$ when the voltage $V_{OutInt}$ is equal to $V_{XMax}$.

$$I_{Out}|_{VOutInt=0} \cong 2 \div 3 I_{Out}|_{VOutInt=steady\_state} \quad (8)$$

In turn, the current $I_{Lim}$ must be larger than or equal to $I_{Out}|_{VOutInt=}$ and this may determine an excessively fast decreasing of the voltage $V_{OutInt}$. For example, for a charge pump that must provide a steady state current $I_{Out}|_{VOutInt=steady\_state}$ of 1 mA at a frequency f of 20 MHz, with a parasitic capacitance $C_{OutInt}$ of 1 pF, the slope of $V_{OutInt}$ would be:

$$\frac{dV_{OutInt}}{dt} = \frac{I_{Lim} - I_{Out}|_{VOutInt=steady\_state}}{C_{OutInt}} \quad (9)$$

$$= \frac{(1 \div 2) \cdot 1mA}{1pF}$$

$$= 1 \div 2 \frac{V}{ns}$$

Therefore, in a half-period of 25 ns of the clock, the voltage $V_{OutInt}$ would drop by about 25-50V, and this is very risky for the charge pump integrity.

To prevent this, it is a common practice to connect a relatively large additional capacitor $C_{Add}$ in parallel with the capacitance $C_{OutInt}$, as shown in FIG. 13, for letting the voltage $V_{OutInt}$ decrease to zero with a less steep slope $$\frac{dV_{OutInt}}{dt} = \frac{1 \div 2 I_{Out}|_{VOutInt=steady\_state}}{C_{OutInt} + C_{Add}} \quad (10)$$

Unfortunately, the required additional capacitor occupies a relatively large silicon area.

SUMMARY OF THE INVENTION

This invention provides an efficient and effective approach to the problem of protecting a multi-stage charge pump from abrupt reductions of the output voltage required by a certain load to be supplied by the charge pump that significantly reduces the silicon area requirement compared to the above discussed known approaches.

It has been found that the problem of protecting the devices that compose the charge pump is more efficiently solved by connecting a high-voltage transistor, that is a transistor capable of withstanding a voltage drop across its current terminals equal to the maximum voltage that must be supplied to a load, between the output node of the charge pump and the load being supplied, and in controlling this transistor with a fraction of the output voltage of the charge pump. This is accomplished by connecting the control node of the high-voltage transistor to a node of connection between two stages of the multi-stage charge pump onto which a fraction of the controlled output voltage of the multi-stage charge pump is produced.

In practice, the high-voltage output transistor protects the low voltage devices of the multi-stage charge pump, by preventing the controlled output voltage from undergoing excessively abrupt variations, that could damage the transistors of the last stage of the charge pump.

BRIEF DESCRIPTION OF THE DRAWINGS

The various aspects and advantages of the invention will become even more evident through the following description of a preferred embodiment, referring to the attached drawings, wherein.

DETAILED DESCRIPTION OF THE PREFERRED EMBODIMENTS

Figure 1A:
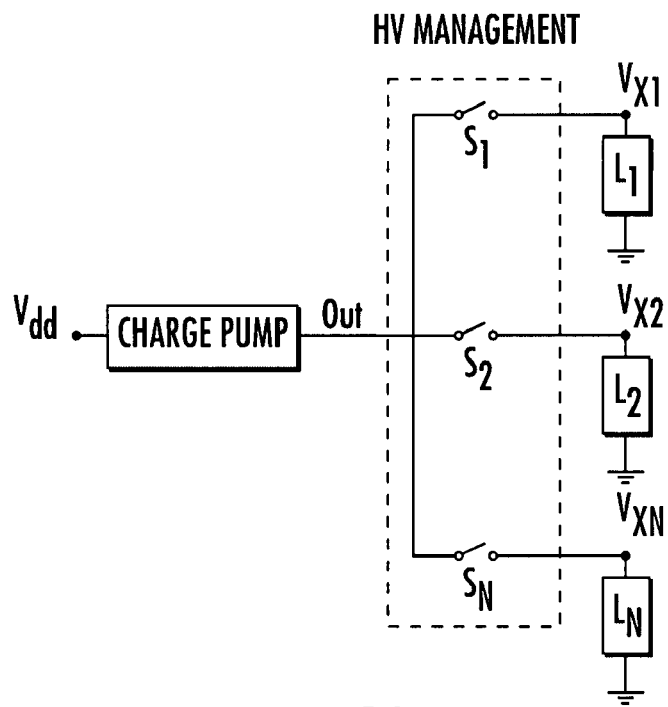
FIG. 1A is a schematic diagram illustrating a charge pump the output of which may be switched to any of a plurality of loads through an array of switches according to the prior art.
Figure 1B:
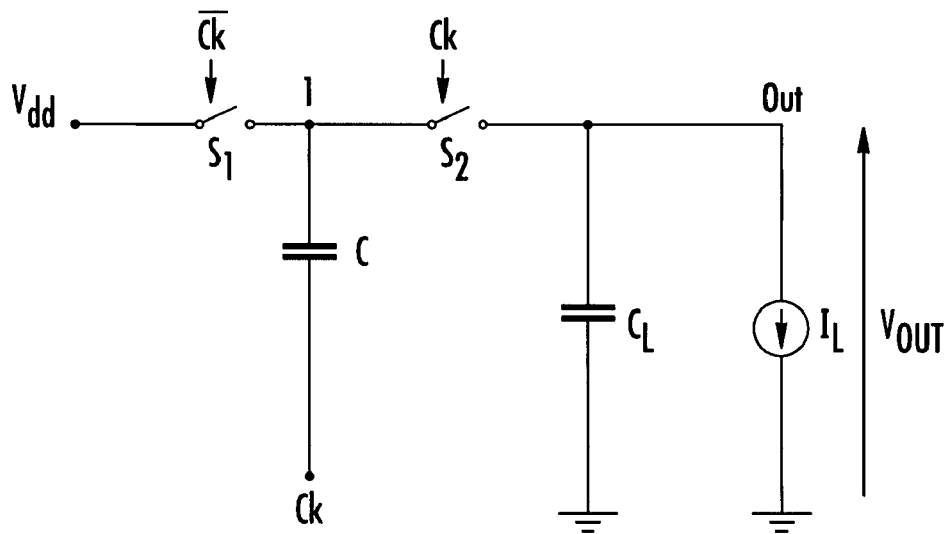
FIG. 1B is a schematic diagram illustrating the equivalent circuit of a load powered by the charge pump of FIG. 1A.
Figure 2:
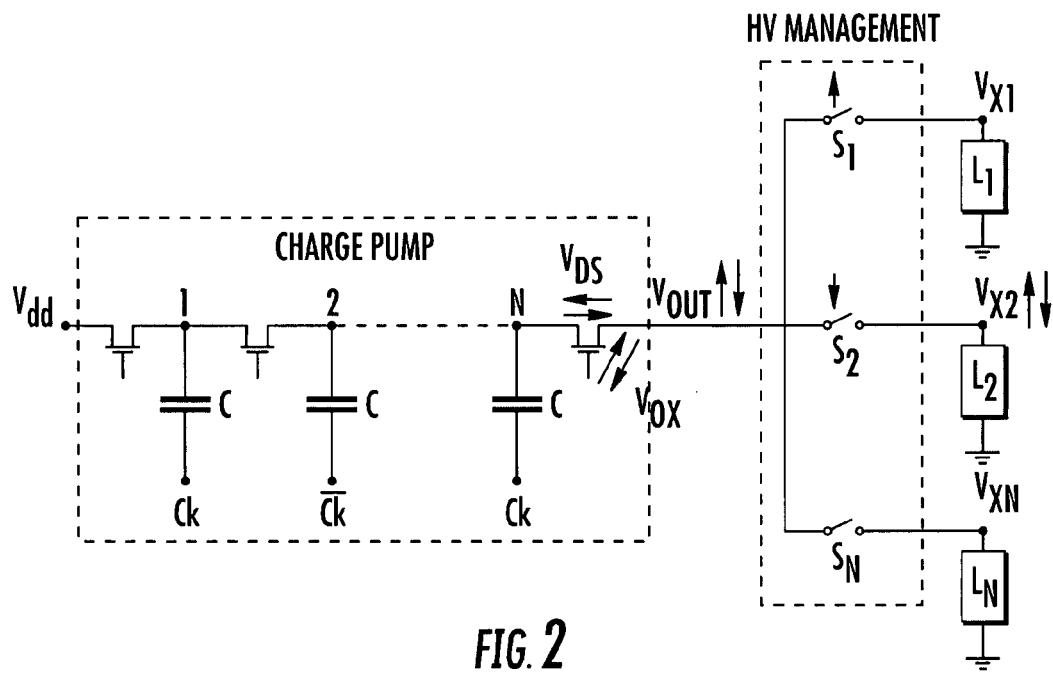
FIG. 2 is a detailed view of the circuit shown in FIGS. 1A and 1B.
Figure 3:
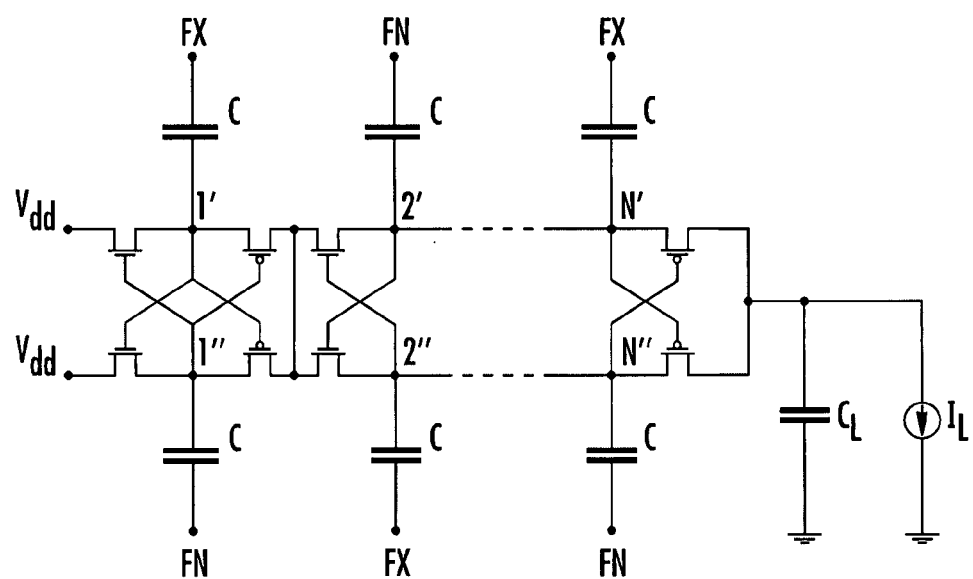
FIG. 3 is a schematic diagram illustrating a known latch charge pump.
Figure 4:
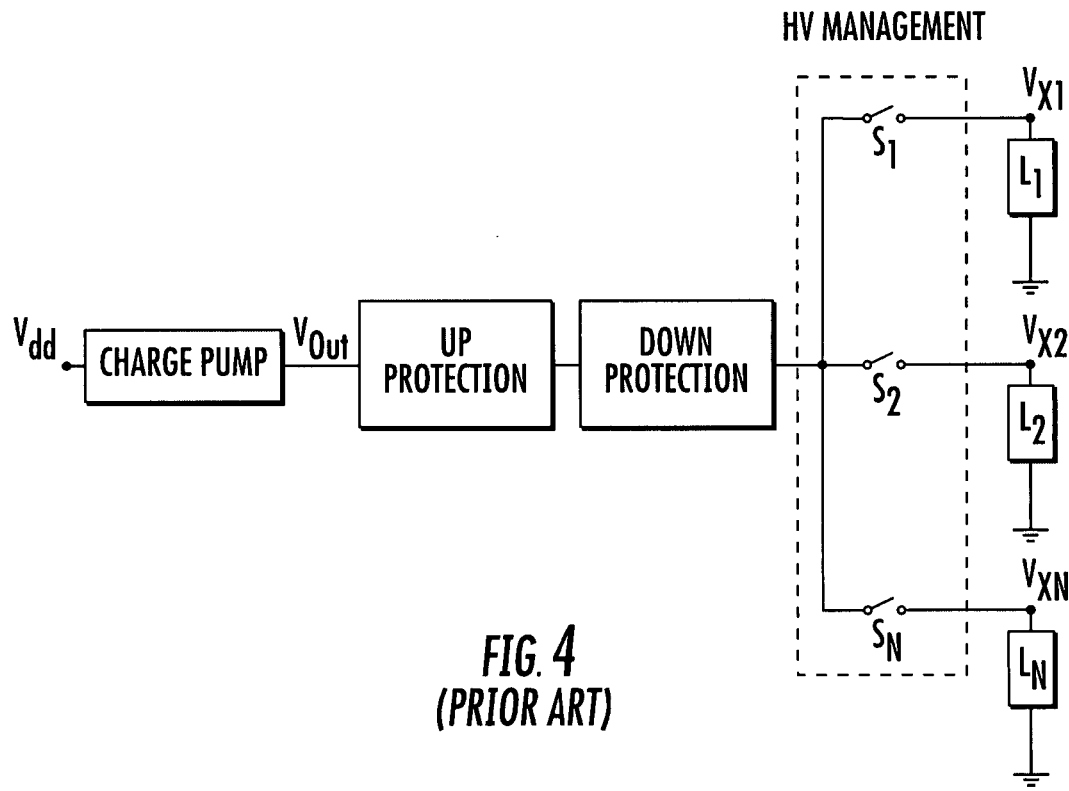
FIG. 4 is a schematic diagram illustrating a charge pump with protection circuits against abrupt variations of the output voltage upon changing the load to be powered according to the prior art.
Figure 5:
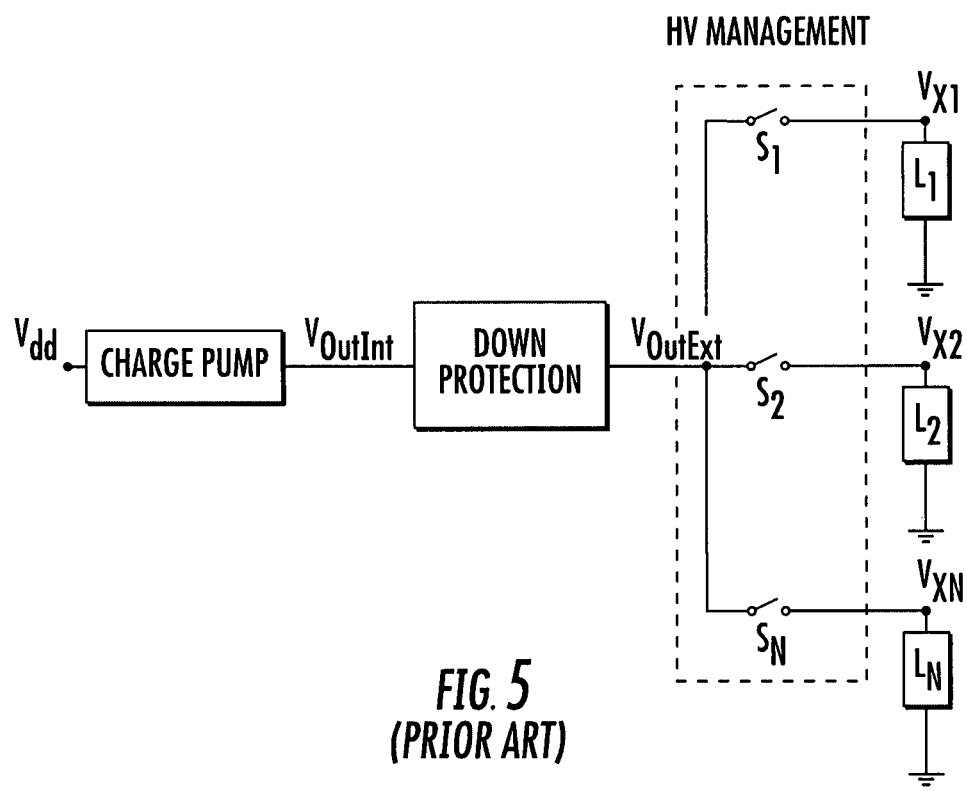
FIGS. 5 and 6 are schematic diagrams illustrating a protection circuit against abrupt reductions of the output voltage.
Figure 6:
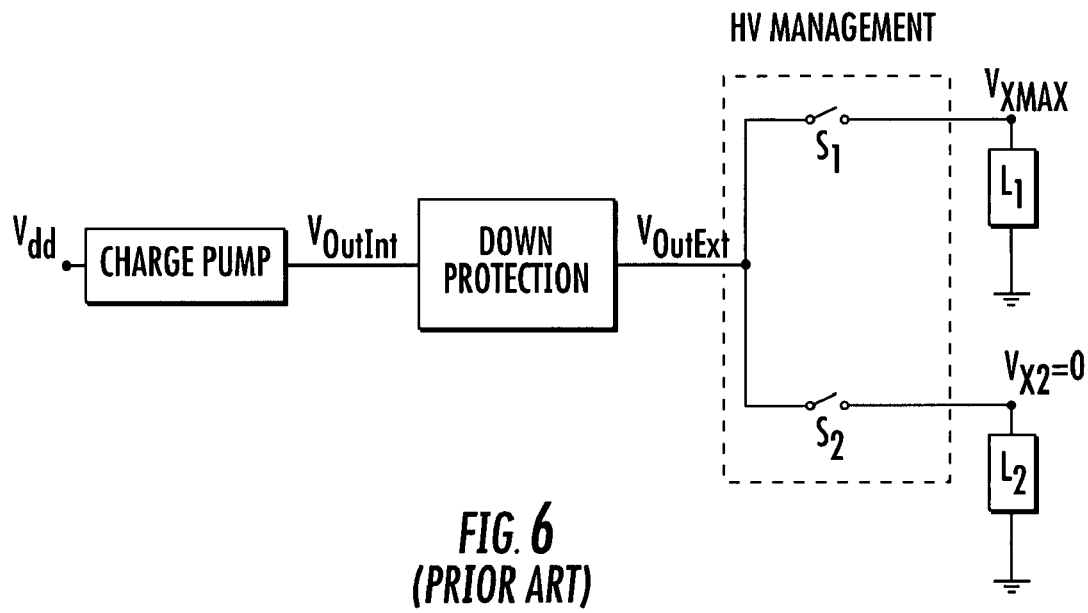
Figure 7:
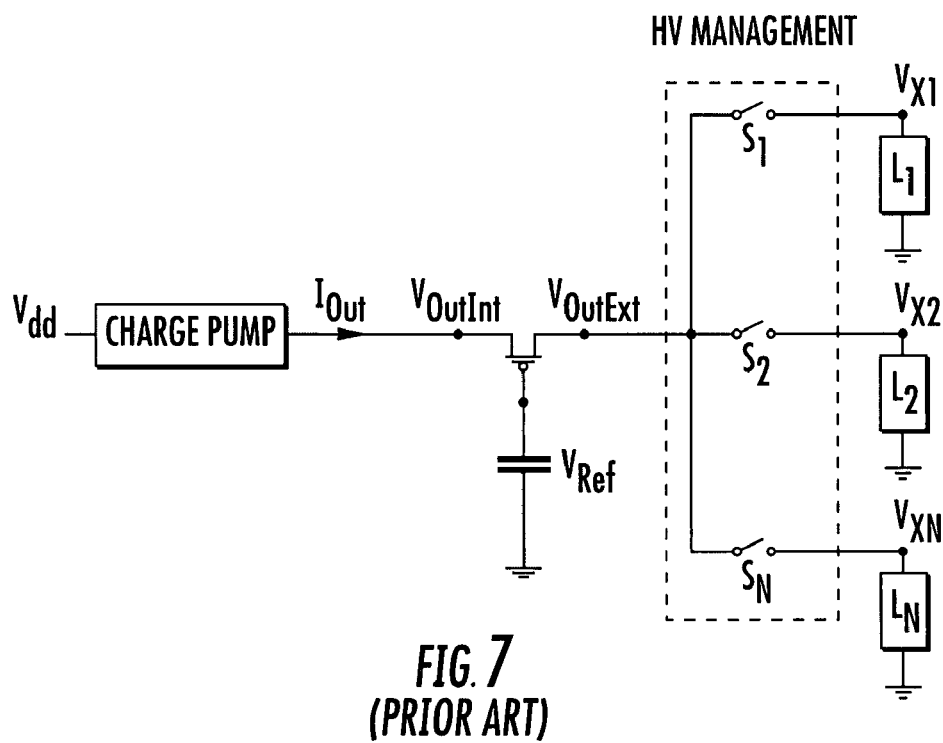
FIG. 7 is a schematic diagram illustrating a charge pump provided with a voltage limiter according to a known technique.
Figure 8:
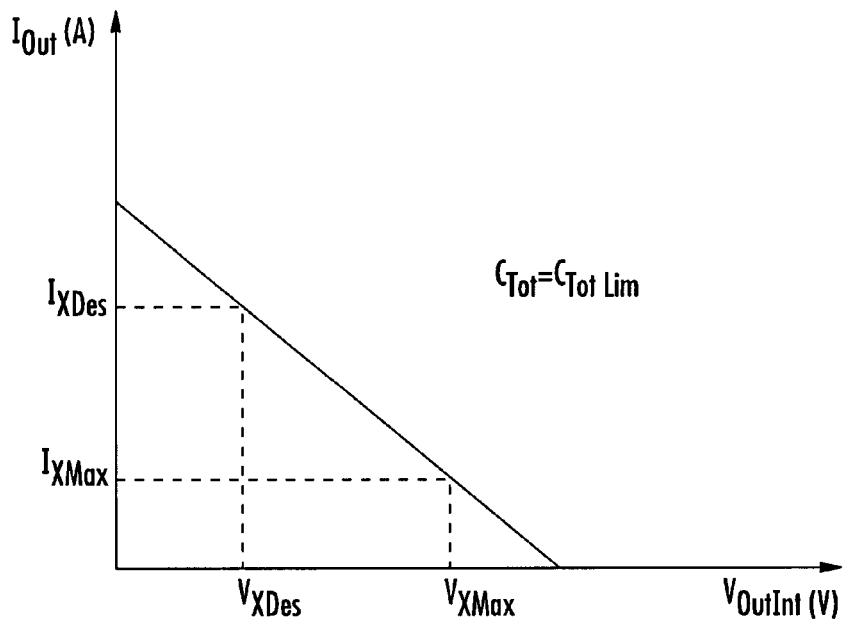
FIG. 8 is a diagram illustrating a voltage-current characteristic of a charge pump according to the prior art.
Figure 9:
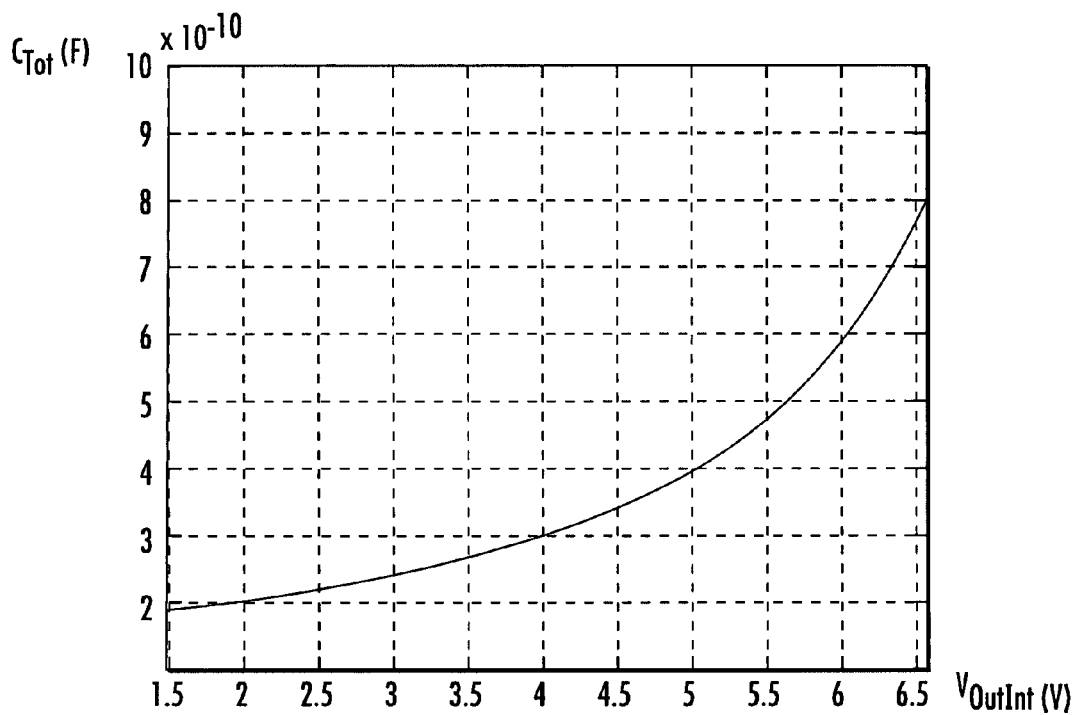
FIG. 9 is a diagram illustrating a voltage-capacitance characteristic of a charge pump according to the prior art.
Figure 10:
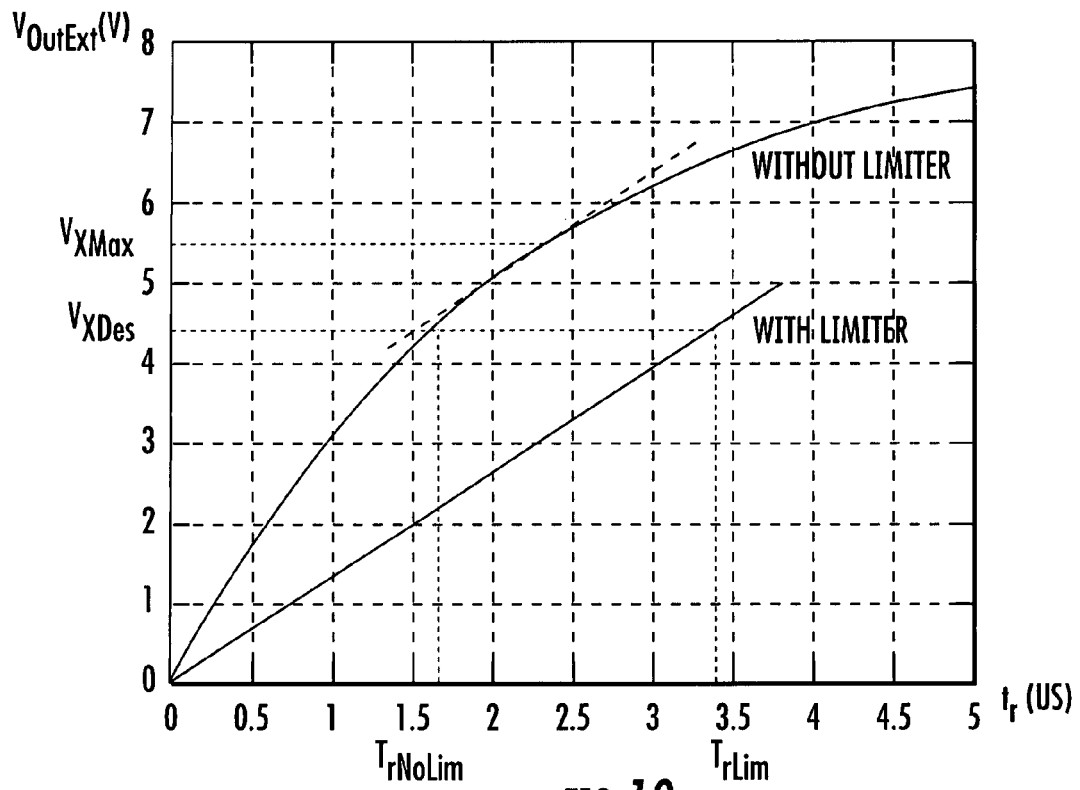
FIG. 10 is a graph that compares the rise and slope of the output voltage of the circuit of FIG. 7, with and without the voltage limiter.
Figure 11:
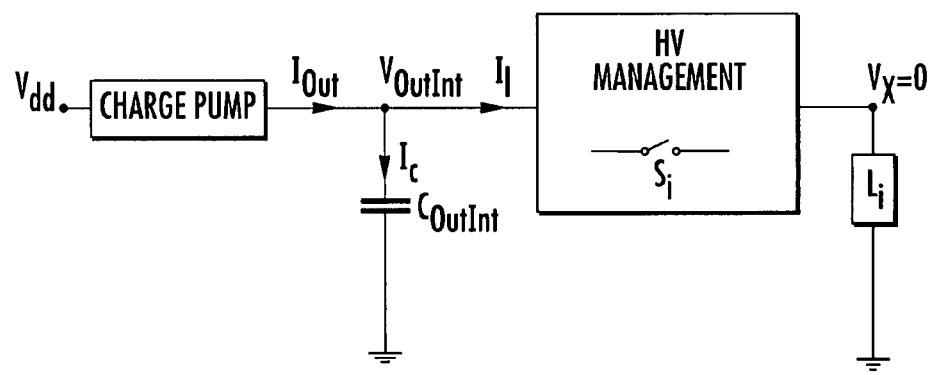
FIG. 11 is a schematic diagram illustrating a charge pump with its parasitic output node capacitance according to the prior art.
Figure 12:
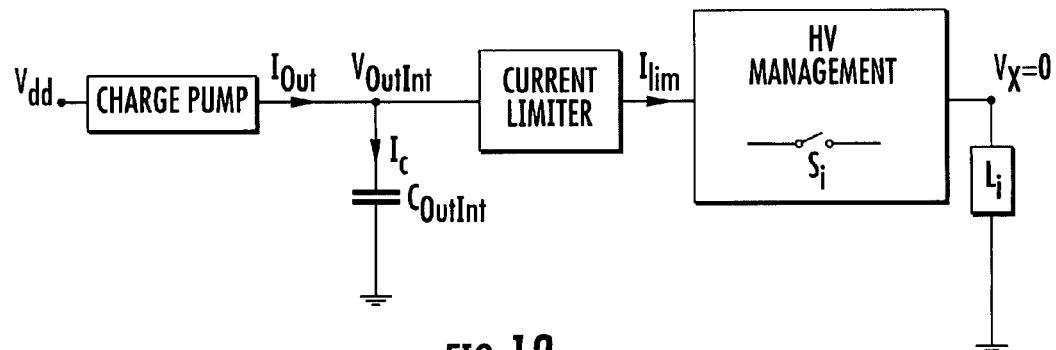
FIG. 12 is a schematic diagram illustrating the charge pump of FIG. 11 with a current limiter.
Figure 13:
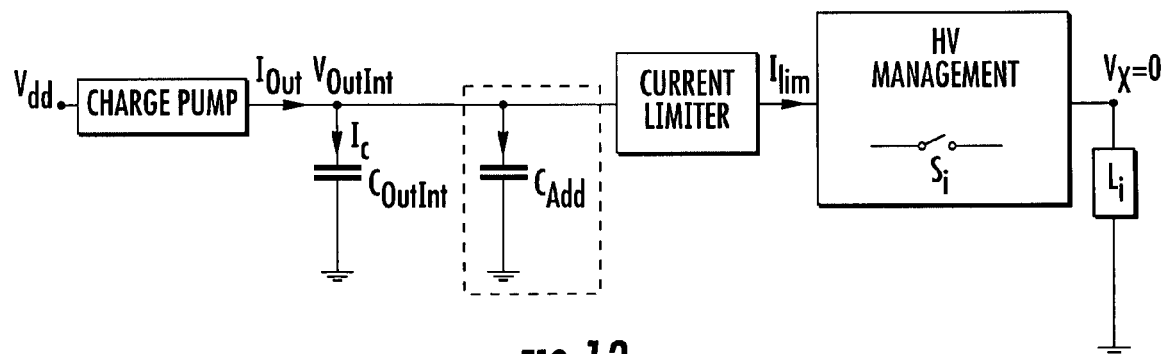
FIG. 13 is a schematic diagram illustrating the charge pump of FIG. 11 with the current limiter and with an additional capacitor.

According to this invention, the output voltage $V_{OutInt}$ of the charge pump is effectively limited and forced to decrease gradually while using a circuit architecture with similar features to that of FIG. 7. According to this invention, the voltage $V_{Ref}$ is not constant, as in the prior art, but is kept substantially constant only during the same half-period of the clock, especially during the half-period in which the voltage $V_{OutExt}$ drops abruptly, and varies during the other half-periods of the clock. The variations $\Delta V_f$ of the voltage $V_{OutInt}$ are given by the following equation:

$$\Delta V_f = V_{OutInt} - V_{Outmin} = V_{OutInt} - (V_{Ref} + V_{Th}) \quad (11)$$

Figure 14:
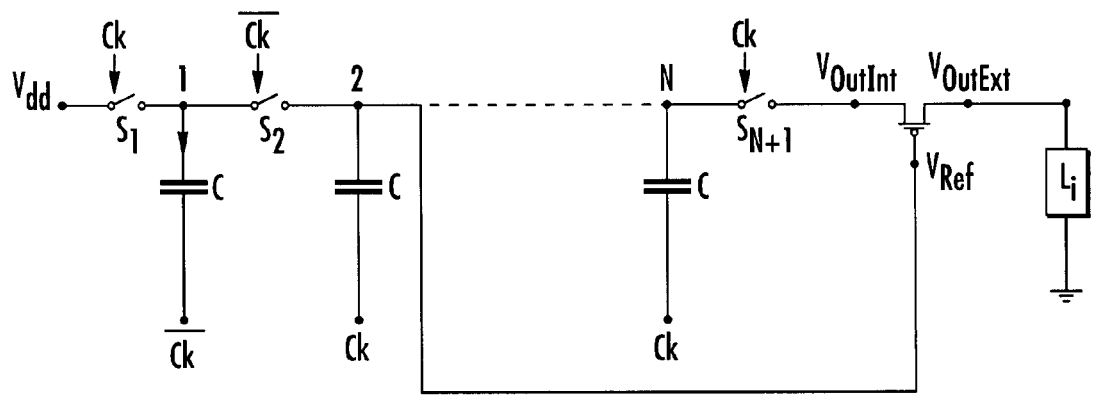
FIG. 14 is a schematic diagram illustrating a charge pump with a protection circuit in accordance with the present invention.
Figure 15:
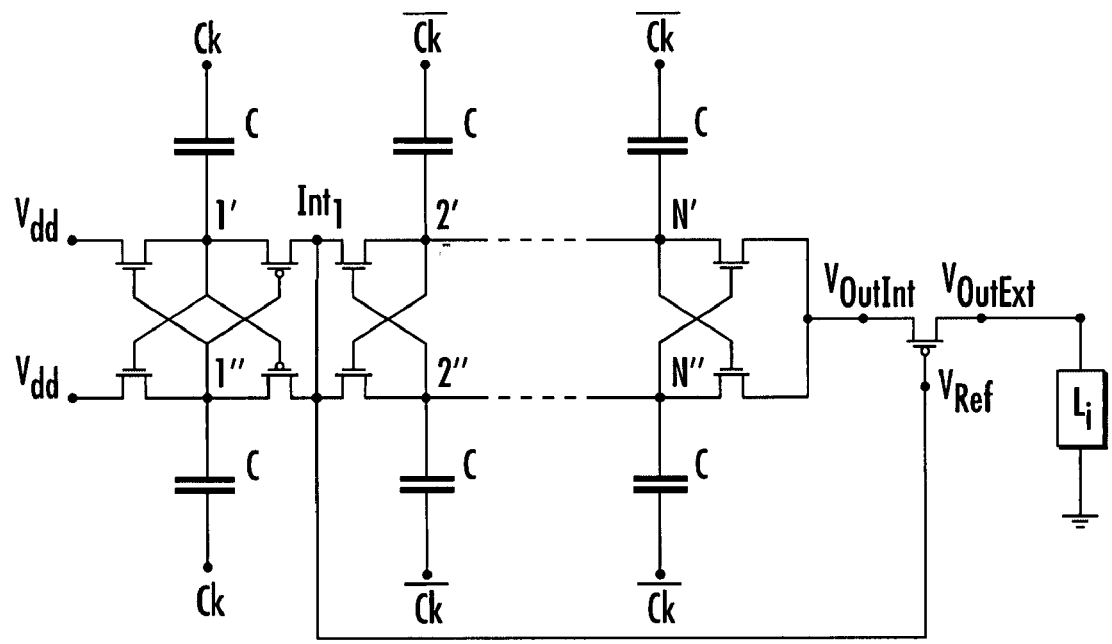
FIG. 15 is a schematic diagram illustrating a latch charge pump with a protection circuit of the present invention.

By connecting the control node of the added high voltage PMOS output transistor to an intermediate node Int of the charge pump, that is to the connection node of two stages of the multi-stage charge pump, as shown in FIG. 14, and in particular for a latch charge pump as shown in FIG. 15, after several clock periods, the voltage $V_{Ref}$ follows the voltage $V_{OutInt}$, thus allowing the latter to gradually adapt itself to the output voltage drop. In so doing, the voltage $V_{Ref}$ is practically constant during the same half-periods, while any reduction of the output voltage $V_{OutInt}$ propagates back to and beyond the node Int, in several clock periods, making the voltage $V_{Ref}$ follow the voltage $V_{OutInt}$.

Figure 16:
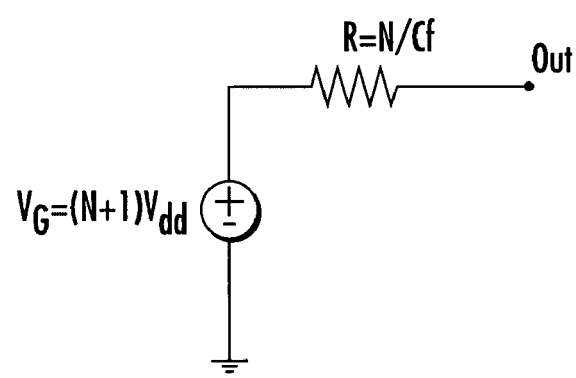
FIGS. 16 and 17 are schematic diagrams illustrating equivalent circuits of an N stage charge pump in accordance with the present invention.

This feature may be better understood by modeling the charge pump with an equivalent circuit. As depicted in FIG. 16, an N stage charge pump may be modeled with an equivalent circuit composed of a voltage generator $V_G$ producing the output voltage of the charge pump in absence of a load, and of a resistor R accounting for the reduction of the voltage on the internal pump capacitor C (not depicted) of the charge pump when electric charge is transferred to the storage capacitor (not depicted) that holds the voltage $V_{OutInt}$, according to the following formula:

$$V_{OutInt} = (N+1)V_{dd} - \frac{N}{C \cdot f} I_{Out} = V_G - R I_{Out} \quad (12)$$

wherein f is the clock frequency.

Figure 17:
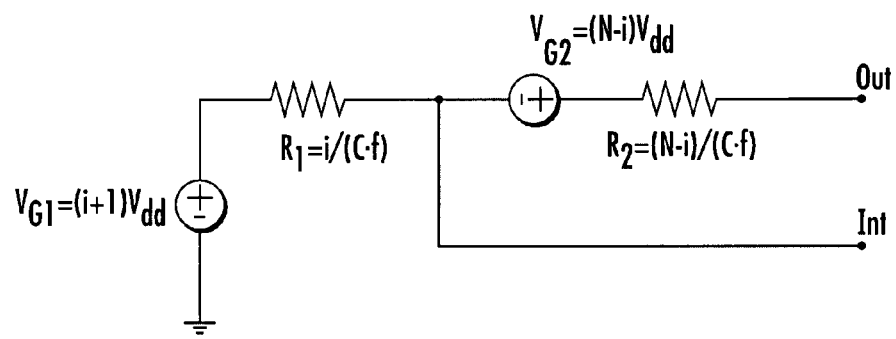
Figure 18:
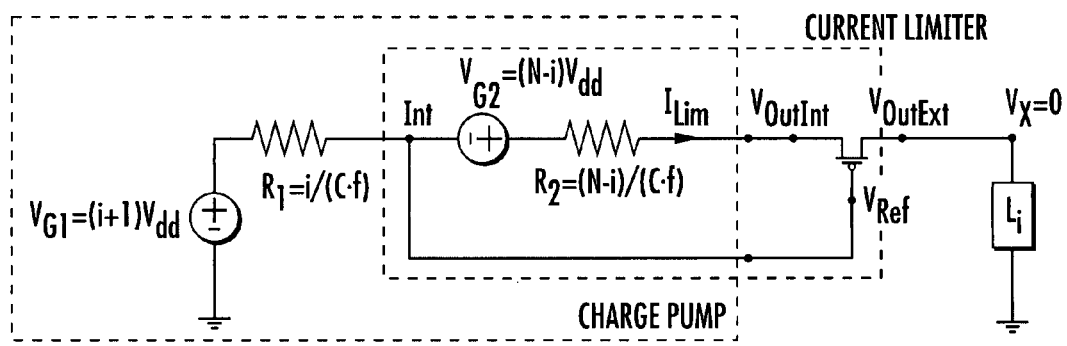
FIG. 18 is a schematic diagram illustrating an equivalent circuit of the boosted voltage generator of the present invention of FIGS. 14 and 15.

The equivalent circuit of FIG. 16 is modified for showing the internal node Int of the charge pump, as shown in FIG. 17. According to this invention, a high voltage PMOS transistor is connected between the nodes Out and Int, as shown in FIG. 18, and is controlled by the voltage $V_{Ref}$. The sub-circuit composed of the generator $V_{G2}$, the resistor $R_2$ and the PMOS acts as a current limiter. Basically, the voltage $V_{G2}$ acts as a reference voltage, $R_2$ as a sensing resistor and the PMOS as a comparator. The current $I_{Lim}$ delivered by this current limiter is given by the following formula $$I_{Lim} \cong \frac{V_{G2}}{R_2} = V_{dd} \cdot C \cdot f \qquad (13)$$

if the source-gate voltage $V_{SG}$ of the PMOS is negligible by realizing the transistor with a sufficiently wide channel. The current $I_{Lim}$ is substantially the same current output by the charge pump when the voltage $V_{OutInt}$ is null:

$$V_{Out} = (N+1)V_{dd} - \frac{N}{C \cdot f} I_{Out} = 0 \Rightarrow I_{Out} \cong V_{dd} \cdot C \cdot f \qquad (14)$$

wherein N>>1.

The control node of the high-voltage PMOS may be connected to any intermediate node (1, 2, ..., N in FIG. 14 and 15 or $Int_1$, $Int_2$, ... in FIG. 15). In fact, as shown in eq. (13), the value of the current $I_{Lim}$ does not depend on the particular intermediate node.

In the embodiment described, a high-voltage PMOS has been used as voltage and current limiter, but a skilled person would immediately recognize that this choice was done because the boosted voltage of the generator was implicitly assumed to be positive. If instead, the charge pump generates a negative boosted voltage, a high-voltage NMOS would be used in place of the PMOS.

By summarizing, the generator of this invention behaves as a voltage limiter during same half-periods, thus protecting the charge pump, and as a current limiter over several clock periods for allowing the voltage $V_{OutInt}$ to decrease gradually, even down to zero, if the voltage drop on the supplied load becomes practically null. These objectives are achieved by adding a high voltage PMOS and thus with a very limited added requisite of silicon area compared to the known approaches.

Figure 19:
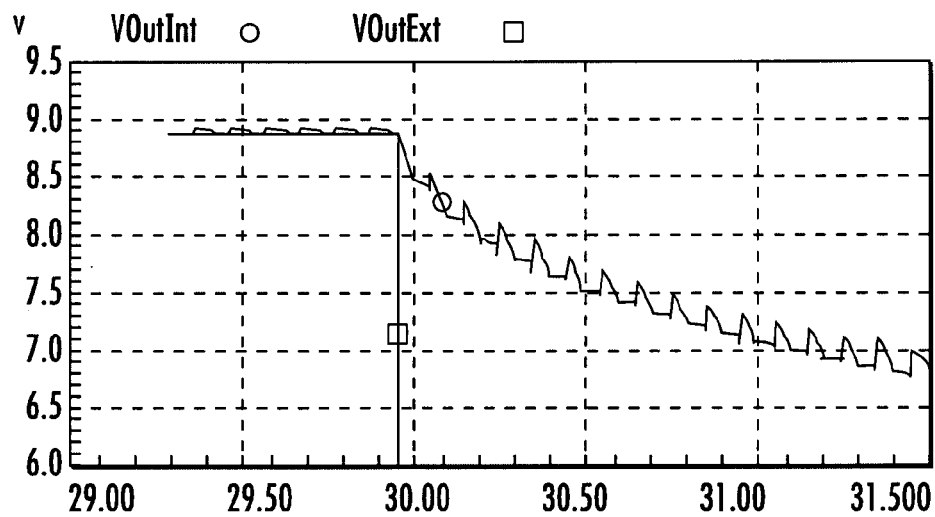
FIG. 19 is a graph to illustrate simulations of the operation of the boosted voltage generator of the present invention of FIGS. 14 and 15 upon an abrupt reduction of the output voltage.

FIG. 19 is a graph of simulations of the functioning of the circuit of FIG. 18 when the voltage $V_{OutExt}$ drops abruptly to zero, for example because a completely discharged load capacitance is connected to the output node of the boosted voltage generator. As may be noticed, the output voltage of the charge pump $V_{OutInt}$ decreases gradually with a voltage ripple smaller than 500 mV at each clock period.

Figure 20:
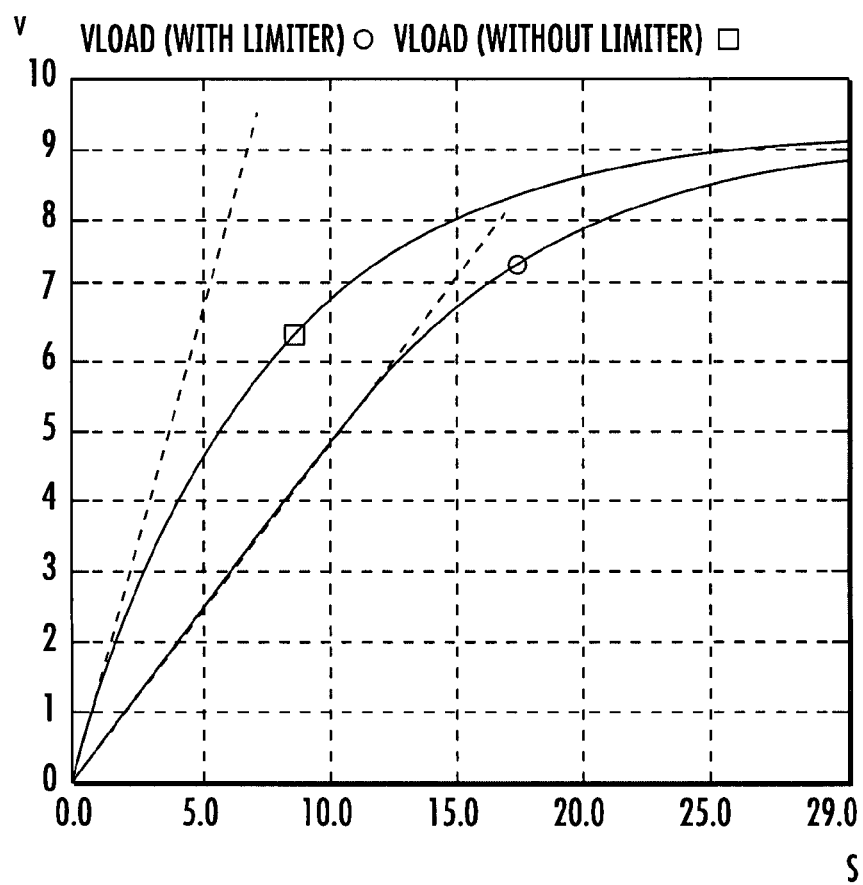
FIG. 20 is a graph illustrating a comparison of the rise and slope of the output voltage of the circuit of FIGS. 14 and 15, and a voltage generator without the protection circuit of the present invention.

FIG. 20 shows comparative simulations of the charge pump with and without the protection circuit of this invention, during a load transient. Without the protection circuit the voltage drop on the load is exponential, while in presence of the protection circuit it remains linear for most of the transient.

The invention claimed is:

1. A boosted voltage generator for connection to a load, comprising:
    a positive voltage multi-stage charge pump including at least two stages with a connection node therebetween, and generating a boosted positive voltage on an output node; and
    an output high-voltage PMOS transistor having conduction terminals connected between the output node of said positive voltage multi-stage charge pump and the load, and having a control terminal connected to the connection node between the at least two stages of said positive voltage multi-stage charge pump.

2. The generator of claim 1, wherein said positive voltage multi-stage charge pump comprises a latch charge pump.

3. The generator of claim 1, wherein the output high-voltage PMOS transistor comprises a high-voltage transistor capable of withstanding a voltage drop across its conduction terminals equal to a maximum voltage for supply to the load.

4. A method of protecting low-voltage transistors of a positive voltage multi-stage charge pump from abrupt variations of the output voltage upon coupling a load to the charge pump, the method comprising:
    connecting an output high-voltage PMOS transistor between an output node of the positive voltage multi-stage charge pump and the load; and
    controlling the output high-voltage PMOS transistor based upon a voltage present on a connection node between two stages of said positive voltage multi-stage charge pump.

5. The method of claim 4, wherein the output high-voltage PMOS transistor has a control terminal connected to the connection node between the two stages of the positive voltage multi-stage charge pump.

6. The method of claim 4, wherein said positive voltage multi-stage charge pump comprises a latch charge pump.

7. The method of claim 4, wherein the output high-voltage PMOS transistor comprises a high-voltage transistor capable of withstanding a voltage drop across its terminals equal to a maximum voltage for supply to the load.

8. A boosted voltage generator for connection to a load, comprising:
    a negative voltage multi-stage charge pump including at least two stages with a connection node therebetween, and generating a boosted negative voltage on an output node; and
    an output high-voltage NMOS transistor having conduction terminals connected between the output node of said negative voltage multi-stage charge pump and the load, and having a control terminal connected to the connection node between the at least two stages of said negative voltage multi-stage charge pump.

9. The generator of claim 8, wherein said negative voltage multi-stage charge pump comprises a latch charge pump.

10. The generator of claim 8, wherein the output high-voltage NMOS transistor comprises a high-voltage transistor capable of withstanding a voltage drop across its conduction terminals equal to a maximum voltage for supply to the load.

11. A method of protecting low-voltage transistors of a negative voltage multi-stage charge pump from abrupt variations of the output voltage upon coupling a load to the charge pump, the method comprising:
    connecting an output high-voltage NMOS transistor between an output node of the negative voltage multi-stage charge pump and the load; and
    controlling the output high-voltage NMOS transistor based upon a voltage present on a connection node between two stages of said negative voltage multi-stage charge pump.

12. The method of claim 11, wherein the output high-voltage NMOS transistor has a control terminal connected to the connection node between the two stages of the negative voltage multi-stage charge pump.

13. The method of claim 11, wherein said negative voltage multi-stage charge pump comprises a latch charge pump.

14. The method of claim 11, wherein the output high-voltage NMOS transistor comprises a high-voltage transistor capable of withstanding a voltage drop across its terminals equal to a maximum voltage for supply to the load.

* * * * *

UNITED STATES PATENT AND TRADEMARK OFFICE
CERTIFICATE OF CORRECTION

PATENT NO. : 7,256,640 B2
APPLICATION NO. : 11/028392
DATED : August 14, 2007
INVENTOR(S) : Ucciardello et al.

It is certified that error appears in the above-identified patent and that said Letters Patent is hereby corrected as shown below:

Title page (75) in the address    Delete: "Cantania"
                                  Insert: -- Catania --

Column 3, Line 58                 Delete: "$V_{Outmim}$"
                                  Insert: -- $V_{Outmin}$ --

Column 4, Line 31                 Delete: "$I_{Out}|_{VOutInt=}$"
                                  Insert: -- $I_{Out}|_{VOutInt=0}$ --

Signed and Sealed this

Twenty Second Day of April, 2008

JON W. DUDAS
*Director of the United States Patent and Trademark Office*